US007440961B1

(12) United States Patent
Matousek

(10) Patent No.: US 7,440,961 B1
(45) Date of Patent: Oct. 21, 2008

(54) SYSTEM AND METHOD FOR FILTERING RECURRENCE EVENTS

(75) Inventor: Jon Matousek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 447 days.

(21) Appl. No.: 10/781,983

(22) Filed: Feb. 18, 2004

(51) Int. Cl.
G06F 7/00 (2006.01)
G06F 17/30 (2006.01)

(52) U.S. Cl. .......................................... 707/101; 707/3
(58) Field of Classification Search ...................... 707/3, 707/102, 101; 705/9
See application file for complete search history.

(56) References Cited

U.S. PATENT DOCUMENTS

| | | | | |
|---|---|---|---|---|
| 5,813,013 | A * | 9/1998 | Shakib et al. ............... | 707/102 |
| 5,893,073 | A * | 4/1999 | Kasso et al. ................ | 705/8 |
| 5,918,216 | A * | 6/1999 | Miksovsky et al. ........... | 705/35 |
| 6,272,074 | B1 * | 8/2001 | Winner ....................... | 368/10 |
| 6,360,217 | B1 * | 3/2002 | Gopal et al. ................ | 707/3 |
| 6,366,926 | B1 * | 4/2002 | Pohlmann et al. ........ | 707/104.1 |
| 6,369,840 | B1 * | 4/2002 | Barnett et al. .............. | 715/853 |
| 6,370,566 | B2 * | 4/2002 | Discolo et al. ............. | 709/206 |
| 6,594,637 | B1 * | 7/2003 | Furukawa et al. ............. | 705/9 |
| 2001/0054072 | A1 * | 12/2001 | Discolo et al. ............. | 709/206 |
| 2002/0161877 | A1 * | 10/2002 | Stevenson et al. ........... | 709/223 |
| 2003/0041076 | A1 * | 2/2003 | Lucovsky et al. ........... | 707/500 |
| 2003/0225732 | A1 * | 12/2003 | Chan et al. ..................... | 707/1 |

OTHER PUBLICATIONS

Blum, D., "It's Crunch Time for Calendar Software," *Network World* 13(30):28, Jul. 22, 1996.
Kerstetter, J., and C. Walker, "Calendaring on Schedule," *PC Week* 14(30):1, Jul. 14, 1997.
Lee, H., "Your Time and My Time: A Temporal approach to Groupware Calendar Systems," *Information & Management* 40(3):159-164, 2003.
Lindenbaum, S., "Share and Share Alike," *PC Magazine* 17(3):40, Feb. 10, 1998.
Applicant's Statement of a Non-Public Use regarding features of a beta version of Microsoft Office distributed to a fixed number of users in or about Oct. 2002.

* cited by examiner

*Primary Examiner*—Apu Mofiz
*Assistant Examiner*—Cindy Nguyen
(74) *Attorney, Agent, or Firm*—Christensen O'Connor Johnson Kindness PLLC

(57) ABSTRACT

A system, method, and computer-readable medium is provided that enables the filtering of recurrence events. Also, filtering of recurrence events and exceptions to recurrence events in calendar software is supported. The calendar software is Web-based and includes a database located on a server computing device. Recurrence events are stored in the database as single records, thereby minimizing the amount of data stored in the database for transmission between computing devices.

24 Claims, 8 Drawing Sheets

SYSTEM AND METHOD FOR FILTERING RECURRENCE EVENTS

FIELD OF THE INVENTION

The present invention relates to computer programs and, in particular, to computer programs that generate recurrence events, such as calendar software.

BACKGROUND OF THE INVENTION

Calendar software has become a common management tool in many office environments. Calendar software allows users to create and store items in a computer to keep track of an event, such as a meeting, an appointment, etc. An item, which consists of a discrete collection of information that represents an event, can include data that describes the event, data that identifies the time of the event, and other data that is related to the event. Items are typically stored in a database and accessed by users via a client-server application, such as a stand-alone client application, such as Outlook®, or a Web-based client-server system, such as SharePoint®. Among many other functions, existing calendar software allows users to set up a personal calendar having a large number of items, and view a list of their items via a graphical user interface. Typically, the graphical user interface allows users to organize their schedules, create new events, or perform a number of other tasks that involve manipulating items stored in a computing device.

Among many other functions, existing calendar software supports filtering of items that match a criteria. Filters allow users to search for items using criteria defined by the user and supported by the calendar software. Applying filters to items stored in a database is typically performed using the embedded functionality of the database. Without filters, the amount of data conveyed to a user may be excessive or unwieldy. For example, if a user is interested in items that are sporadically scheduled over a 13-month period of time, without a filter the user would have to view 13 months of items to locate the desired information.

Calendar software and other programs allow users to schedule and retrieve recurrence events and exceptions to recurrence events. A recurrence event is a plurality of events, such as meetings or appointments, that occur on a regular basis as defined by the recurrence pattern (i.e., daily, weekly, monthly, and yearly). An exception to a recurrence event is an event instance that differs in any way from the occurrence that would normally be created by the recurrence pattern. Recurrence events and exceptions to recurrence events are typically stored as items in a database and accessed with a client-server application in the same way as other items.

The process of filtering recurrence events and exceptions to recurrence events presents obstacles when a Web-based system is utilized. In a Web-based system, a user must download a database, or a portion thereof, from a server to a client in order to view items in the database. A data distribution schema must be established by the server as to how to deliver the items to the client over a network, such as the Internet.

In a Web-based system, one approach to storing recurrence events is to generate a record of each instance of the recurrence event as a discrete entry in the database. Because the recurrence event is expanded before being stored in the database, each instance of the recurrence event is made available to the embedded filtering functionality of the database. This approach has various problems. One problem is that programs typically support the storage of data (i.e., documents, e-mails, files, etc.) related to a record in a database. If a recurrence event is expanded into individual records, a copy of related data is duplicated and stored with each record. Obviously, this approach consumes an excessive amount of storage space. A similar problem with this approach is that multiple copies of related data are transmitted over a network when a record is retrieved from the database. This takes bandwidth and, thus, may slow data transmission. Users may be deterred from exploiting the benefits of a program if the program is slow due to excessive transmission latency.

Another approach to storing recurrence events is to generate a single record for all instances of the recurrence event for storage in one location in a database. Related data could be associated with the record without being duplicated in multiple locations, saving storage space and minimizing transmission latency between computing devices. After retrieval from the database, the recurrence event would be expanded into individual items, each linked to a copy of related data. A problem with this approach is that the embedded filtering functionality of the database may be limited when storing a recurrence event as a single record in a database.

Typically, programs that store and filter items utilize embedded functionality provided by the database. For example, some databases support Structured Query Languages (SQL) that allow programs to sort, organize, and filter data. If a recurrence event is stored in a single record, the ability to use the functionality provided by the database is restricted, i.e., using the database to filter between instances of a recurrence event is not possible because the instances are stored in the same record.

As will be readily understood from the foregoing discussion, there is a need for a system and method for filtering recurrence events stored in a database. More specifically, there exists a need for a system and method that enables storage of a recurrence event in a single record while allowing filtering of the recurrence event.

SUMMARY OF THE INVENTION

In accordance with this invention, a system, method, and computer-readable medium is provided that enables the filtering of recurrence events. Recurrence events are stored in a database as single records, thereby minimizing the amount of data stored in the database for transmission between computing devices. In accordance with the present invention, because the filtering functionality of a database is limited when a recurrence event is stored as a single record, additional data is obtained from the database and manipulated to enable filtering of recurrence events before items are transmitted to the user.

In accordance with one aspect of the present invention, a request to view a display of items on a computing device is obtained. In response to the request, a list of items, which may include recurrence events, is displayed. Then a determination is made regarding which requests require filtering and which do not. For those requests that require filtering, additional data from the database is obtained and manipulated. The additional data enables filtering of recurrence events without having to store multiple records of the recurrence events in the database.

In accordance with another aspect of the present invention, a request to display items on a computing device is obtained. To handle the request, a middle-tier processing unit is provided that contains a filtered recurrence module, a view-rendering module, an expansion engine, and a paging/centering module. The request, which may include filtering of recurrence events, is handled and a response transmitted to the user.

In one embodiment, the present invention supports filtering of recurrence events and exceptions to recurrence events in calendar software. The calendar software is Web-based and includes a database located on a server computing device. Requests for items are generated by a user who transmits the request to the server over a network. The server satisfies the request and transmits the results back to the user. Requests for items include requests for filtered recurrence events. The requests are satisfied efficiently and quickly because the recurrence events are stored by the calendar software as a single record in a database.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The following description first provides an overview of a system in which the present invention may be implemented. Then a method that enables filtering of recurrence events, which is shown in accompanying diagrams, is described. The illustrative examples described herein are not intended to be exhaustive or to limit the invention to the precise forms disclosed. Similarly, any steps described herein may be interchangeable with other steps, or several combinations of steps, in order to achieve the same result.

Figure 1:
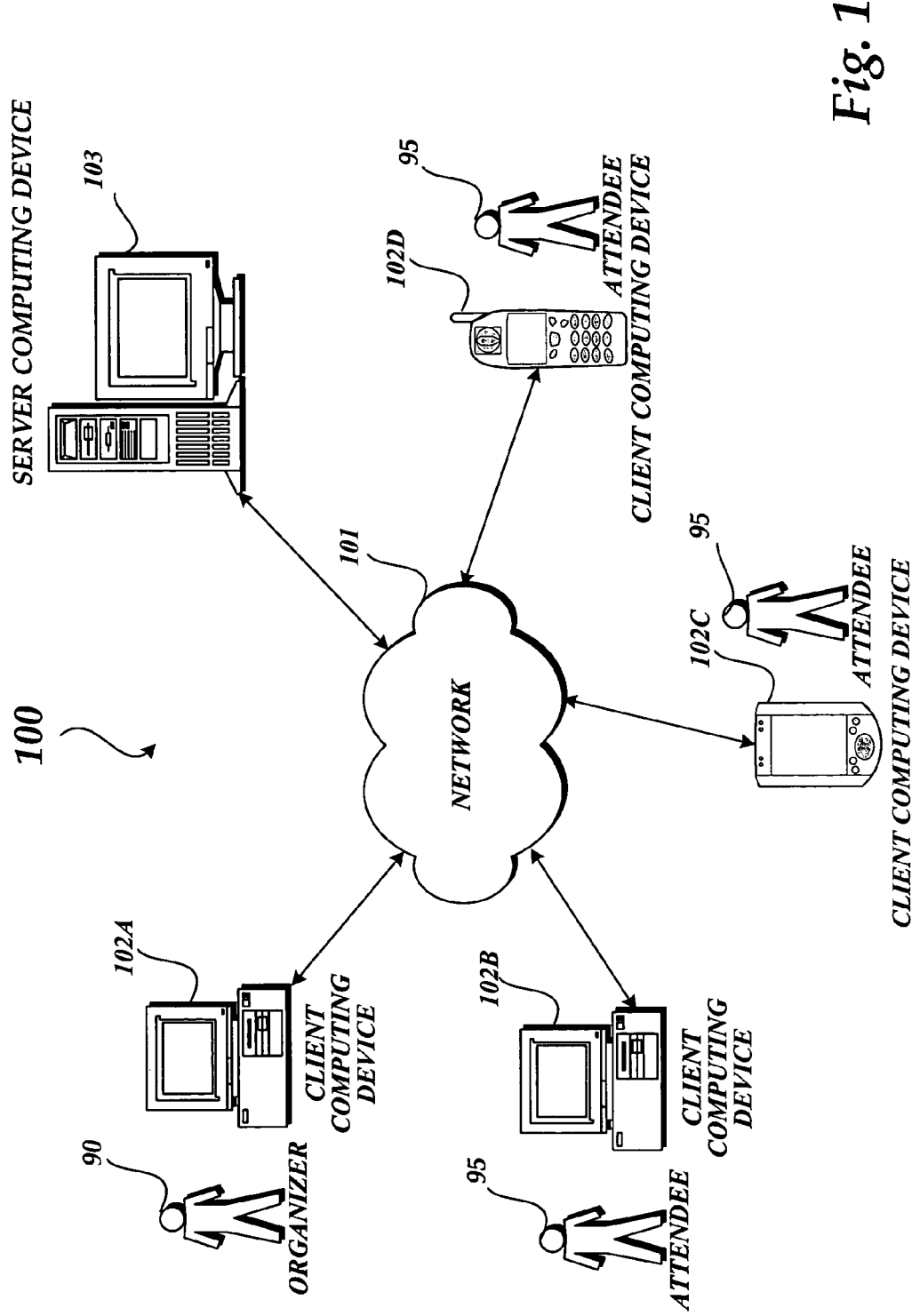
FIG. 1 is a pictorial diagram of computing devices connected to a network, including a server computing device that allows users to communicate via client-server software.

Referring to FIG. 1, the following is intended to provide an exemplary overview of one suitable computer system 100 in which the invention may be implemented. The illustrated computer system 100 comprises a plurality of client computing devices 102A, 102B, 102C, 102D, and at least one server computing device 103. The client computing devices are illustrated as portable PCs 102A and 102B, a personal digital assistant (PDA) 102C, and a telephone 102D. Obviously, as will be readily understood by those skilled in the relevant art and others, FIG. 1 is illustrative and should not be construed as limiting. More or fewer computing devices may be connected together via a network 101. Also, the computing devices 102A, 102B, 102C, 102D may be embodied as any one of a variety of devices that may be utilized to transmit content to the network 101. The client computing devices and the server computing device, depicted in FIG. 1, are configured to electronically communicate via the network 101. The network may be a local area network (LAN) or a larger network, such as a wide area network (WAN) or the Internet. The network may be wired or wireless (for example, using Bluetooth or any of the IEEE 802.11 standards), or a combination. Connection to the network can be established using a variety of communication protocols (e.g., TCP/IP, IPX, SPX, NetBIOS, Ethernet, RS232, and direct asynchronous connections). As known to those having ordinary skill in the art and others, the computer system 100 may be configured to exchange documents, commands, and other types of information between the client computing devices 102A, 102B, 102C, 102D, and the server computing device 103.

The server computing device 103 is configured with an operating system for controlling its operation. As known to those having ordinary skill in the art and others, the operating system may be formed by a general-purpose server operating system such as a Microsoft® server operating system, UNIX or LINUX™. Also, the server computing device 103 is configured with program code and data for providing Web or other network services that allow users to request, receive, and view information and data files stored in the server computing device 103. Web and other network services may be provided by any one of a number of commercially available software packages known in the art. These commercially available packages comprise computer-executable instructions that, when executed by the server computing device 103, generate configurable markup documents. The software packages that provide Web and other network services may be configured with a commercially available software component that facilitates the functions of the present invention described below. The software components for performing the methods of the present invention may be supported by or included as part of one or more commercially available programs, such as an Exchange® server, a NET® server, or a SharePoint® server.

The client computing devices 102A, 102B, 102C, and 102D are also configured with an operating system for controlling their operation. In addition, the client computing devices are configured with a program, such as Microsoft Sharepoint®, and a Web browser application, such as Microsoft Internet Explorer®, that facilitate functions of the present invention.

One application of the present invention is in calendar software that supports the storage, organization, and retrieval of items. A detailed description of calendar software in which the present invention may be implemented is found in commonly assigned, co-pending U.S. patent application Ser. No. 10/603,730, titled SYSTEM AND METHOD FOR GENERATING AND DISPLAYING CALENDAR ITEMS, filed Jun. 24, 2003, the content of which is expressly incorporated herein by reference. Known calender software in which embodiments of the present invention may be implemented are hereinafter collectively referenced as "existing calendar software."

Typically, existing calendar software is implemented in a computer system 100 of the type illustrated in FIG. 1. In such a computer system, one user, such as a meeting organizer 90, can create a recurrence event for storage on the server 103. During the creation of the recurrence event, the meeting organizer 90 will list the names of other users, depicted as meeting attendees 95. The recurrence event is shared with the other users who are scheduled to attend particular events, such as meetings. After a recurrence event is created, the meeting organizer 90 and meeting attendees 95 can access and view items associated with the recurrence event. One exemplary embodiment of the present invention supports filtering of recurrence events in existing calendar software. Although the present invention will be described in the context of existing calender software, those skilled in the relevant art and others will appreciate that the present invention may be implemented in other ways.

Figure 2:
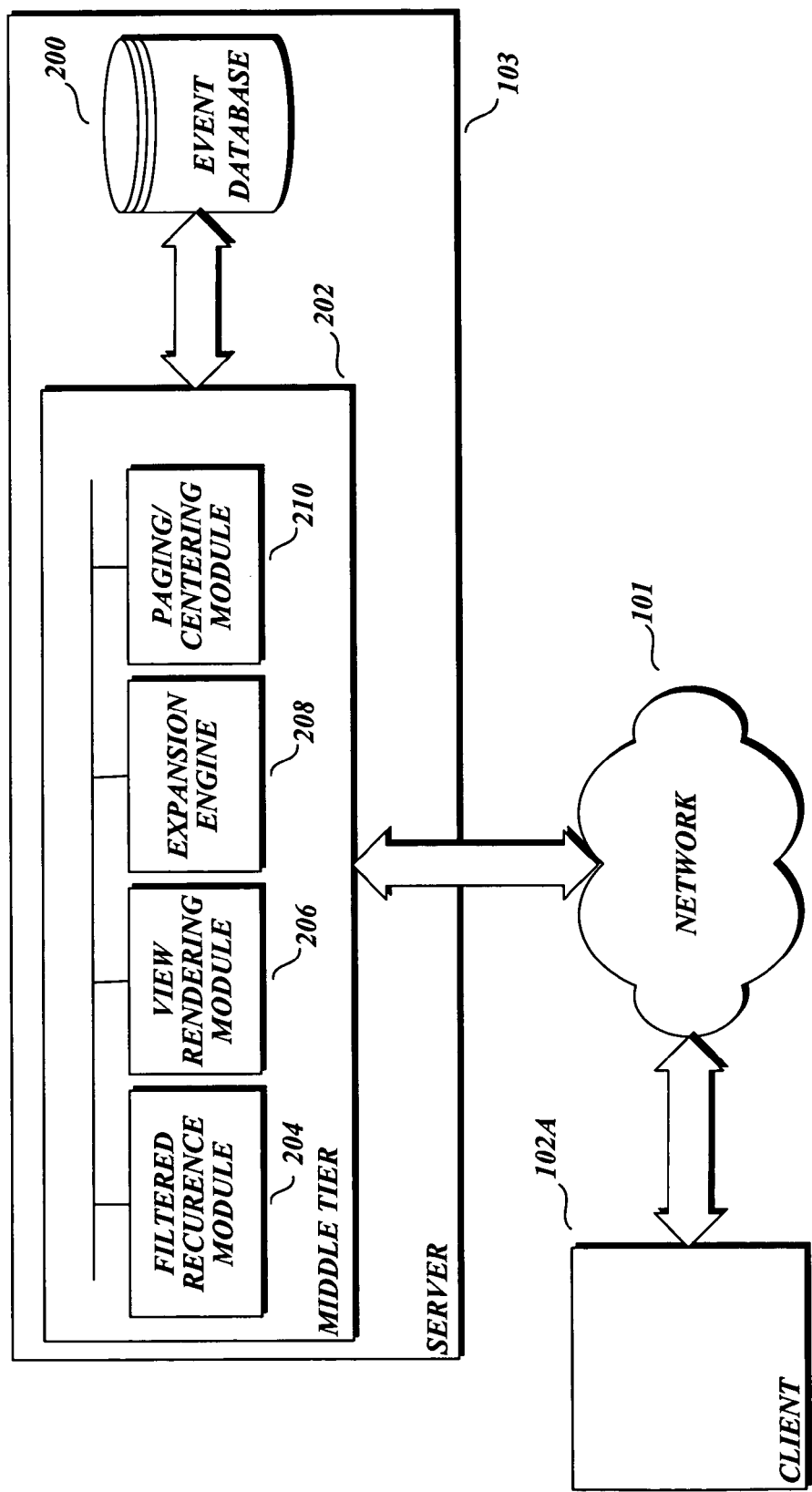
FIG. 2 is a block diagram of the server computing device of FIG. 1, including components contained therein and a single client computing device that may be used to implement embodiments of the present invention.

FIG. 2 depicts a client computing device 102A and a server computing device 103 suitable for implementing an embodiment of the present invention. For ease of illustration and because they are not important for an understanding of the present invention, FIG. 2 does not show the typical components of client computing device 102A and server computing device 103, such as a keyboard, a mouse, a printer, or other input/output devices, a central processing unit, a display, etc. Also, FIG. 2 does not show other computing devices that may be connected to network 101, such as client computing devices 102B, 102C, and 102D described above with reference to FIG. 1.

As shown in FIG. 2, the client computing device 102A and the server computing device 103 are configured to communicate via a network 101. The server computing device 103 includes an event database 200. The event database 200 stores events, including recurrence events. The server may take a suitable form, such as an Exchange® server, a .NET® server, or a SharePoint® server. As will be appreciated by those of ordinary skill in the art or others, the event database 200 may be configured to store items including recurrence events in any one of a number of formats. For instance, the event database 200 may be configured to store dates, times, and other data related to a recurrence event. The event database may also store other types of information such as documents, e-mails, files, and the like.

As will be better understood from the following description, certain features of the present invention may be carried out by a set of software-implemented components located in a middle-tier processing unit 202 (hereinafter "middle tier"). In this regard, while the middle tier software-implemented components employed by embodiments of the present invention will typically be stored on a server, such as server computing device 103, those skilled in the art will recognize that one or more components may be stored on a client, such as client computing device 102A.

The middle tier software-implemented components of the embodiment of the present invention illustrated in FIG. 2 include a filtered recurrence module 204, a view-rendering module 206, an expansion engine 208, and a paging/centering module 210. Components of the middle tier 202 are interconnected and able to communicate with other components using software engineering techniques known in the art. The functions of the components and a method that enables the filtering of recurrence events are described in detail below with reference to FIGS. 3-8.

Figure 3:
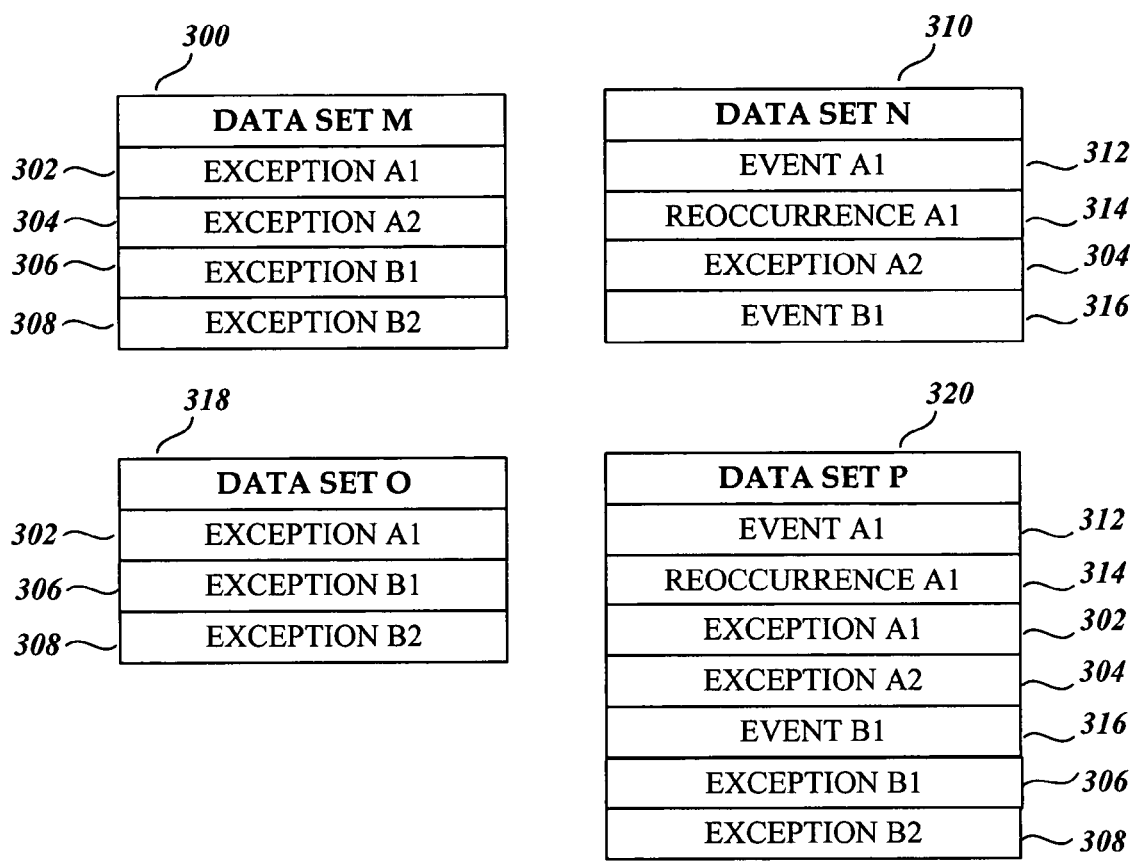
FIG. 3 is a pictorial diagram of data sets that illustrate the process of obtaining and manipulating items so that filtering of recurrence events may be supported.
Figure 4:
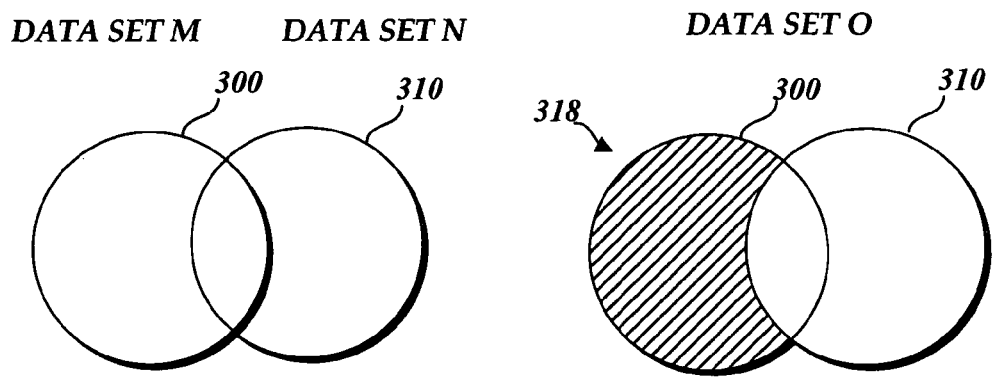
FIG. 4 is a pictorial diagram that illustrates the process of generating a data set so that filtering of recurrence events may be supported.

FIGS. 3-4 illustrate sample data sets that are used to help describe how the present invention enables filtering of recurrence events. For purposes of simplifying the description, items are described as though stored in a central storage location, such as the event database 200 illustrated in FIG. 2. This should be taken as exemplary, not limiting. As will be appreciated by those of ordinary skill in the art and others, items may be stored in other configurations such as distributed databases.

FIG. 3 illustrates four sample data sets—DATA SET M, DATA SET N, DATA SET O, and DATA SET P. DATA SET M 300 consists of EXCEPTION A1 302, EXCEPTION A2 304, EXCEPTION B1 306, and EXCEPTION B2 308. DATA SET N 310 consists of EVENT A1 312, RECURRENCE A1 314, EXCEPTION A2 304, and EVENT B1 316. DATA SET O 318 consists of EXCEPTION A1 302, EXCEPTION B1 306, and EXCEPTION B2 308. DATA SET P 320 consists of EVENT A1, RECURRENCE A1 302, EXCEPTION A1 302, EXCEPTION A2 304, EVENT B1 316, EXCEPTION B1 306, and EXCEPTION B2 308. Items with the same letter identifier are related (i.e., EXCEPTION A1 is related to EVENT A1 but is not related to EVENT B1). As known to those skilled in the art and others, items may be related in any number of ways. In the context of calendar software, items may be related when they involve the same subject matter or require the same participants.

In existing calendar software, a user may apply filters when requesting items. In the exemplary embodiment described here, when a meeting organizer 90 creates a recurrence event for storage on the server computing device 103, the organizer lists the names of groups of users that are to attend the recurrence event. An example filter is where the meeting organizer 90 filters the event from some users included in the groups because they do not need to attend the event. After the event is created, the meeting organizer 90 and the users who are certain to attend the event can access and view the items associated with the event, but other users are filtered from viewing the event.

Data set N 310 consists of events, recurrence events, and exceptions to recurrence events that are filtered using the embedded functionality of the event database 200. In an exemplary embodiment, the middle tier 202 receives a request from a user and generates a SQL query that applies a filter to items in the event database 200. The SQL query is passed to the event database 200, which satisfies the query by returning data set N 310. Existing calendar software provides a mechanism for generating data set N 310 and uses it to produce items for display to a user. However, data set N 310 is insufficient to enable filtering of recurrence events.

As described in more detail below, data set N 310 is insufficient to support filtering of recurrence events because some necessary exceptions may be filtered from inclusion in data set N 310. Existing calendar software uses the embedded functionality of a database, such as event database 200, to filter items. However, event database 200 does not provide a mechanism for obtaining a data set that contains all necessary exceptions. Put differently, a SQL query may not be passed to event database 200 that will return a data set sufficient to support filtering of recurrence events. Thus, the present invention identifies the necessary exceptions that were filtered from data set N 310 and creates a data set comprising all the elements of data set N 310 and the necessary exceptions that were filtered from data set N 310.

To enable filtering of recurrence events, the middle tier 200, in accordance with the present invention, obtains data set M 300 from the event database 200. In an exemplary embodiment, the middle tier 202 receives a request from client computing device 102A and determines if the request requires a filter. If the request requires a filter, the filtered recurrence module 204 generates a SQL query that is passed to the event database 200. The SQL query generated by the filtered recurrence module 204 requests all exceptions for the time frame of the request without applying a filter (hereinafter "unfiltered exceptions"). In response to the SQL query, event database 200 passes data set M 300 to the middle tier 202. Since generating a SQL query that requests unfiltered exceptions is generally known in the art, such a process is not described here.

The present invention next uses data set M 300 and data set N 310 to generate a new data set that is sufficient to filter recurrence events. With reference to FIG. 3, data set M 300 and data set N 310 obtained from the event database 200 are used to construct two additional data sets that enable filtering of recurrence events. Specifically, the filtered recurrence module performs a set difference operation on data set M 300 and data set N 310 to obtain data set O 318. The set difference operation identifies all exceptions that exist in data set M 300 that do not exist in data set N 310. As described above, data set M 300 consists of unfiltered exceptions for the time frame of the request received from the user. Data set N 310 consists of filtered events, recurrence events, and exceptions corresponding to the same time frame. Thus, the set difference operation identifies exceptions that were not included in data set N 310 because of a filter. In the exemplary embodiment illustrated in FIG. 3, EXCEPTION A1 302, EXCEPTION B1 306, and EXCEPTION B2 308 were excluded from data set N 310 because of a filter and, as a result, are included in data set O 318.

As described above, the contents of data set O 318 consists of exceptions that were excluded from data set N 310 because of a filter. Exceptions prevent an instance of a recurrence event from being displayed to a user by replacing a unique identifier associated with each instance of a recurrence event (hereinafter "instance identifier"). As described in more detail below, exceptions in data set O 318 may be used to prevent an instance of a recurrence event from being displayed to the user. However, to make the necessary replacement, the correct instance of a recurrence event must be identified and its instance identifier associated with the appropriate exception. In the exemplary embodiment illustrated in FIG. 3, EXCEPTION A1 302 of data set O 318 needs to be associated with an instance identifier so that an instance of RECURRENCE A1 314 will not be displayed to the user. EXCEPTION B1 306, and EXCEPTION B2 308 do not need to be associated with an instance identifier because their corresponding recurrence event was filtered.

Once data set O 318 is obtained, another data set is generated from the contents of data set N 310 and data set O 318. More specifically, the filtered recurrence module 204 performs a set union operation on data set N 310 and data set O 318 to obtain data set P 320. The set union operation joins all events, recurrence events, and exceptions that exist in data set N 310 with the exceptions in data set O 318. Thus, data set P 320 contains all of the contents of data set N 310 and the exceptions that were excluded from data set N 310 as a result of an applied filter. In the exemplary embodiment illustrated in FIG. 3, data set P 320 contains EVENT A1 312, RECURRENCE A1 314, EXCEPTION A1 302, EXCEPTION A2 304, EVENT B1 316, EXCEPTION B1 306, and EXCEPTION B2 308.

Figure 5:
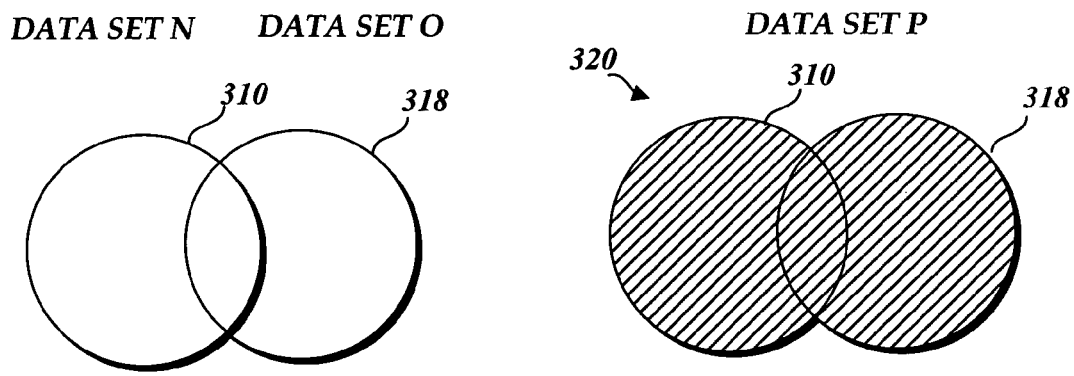
FIG. 5 is a is a pictorial diagram that illustrates the process of generating another data set so that filtering of recurrence events may be supported in accordance with the present invention.

With reference to FIGS. 4-5, the derivation of data set O 318 and data set P 320 from data set M 300 and data set N 310 is illustrated. FIG. 4 demonstrates how data set O 318 is generated by performing a set difference operation on data set M 300 and data set N 310. Items in data set M 300 that are not contained in data set N 310 are identified and placed in data set O 318. FIG. 5 demonstrates how data set P 320 is generated by performing a set union operation on data set N 310 and data set O 318. Items from both data set N 310 and data set O 318 are identified and placed in data set P 320.

Figure 6:
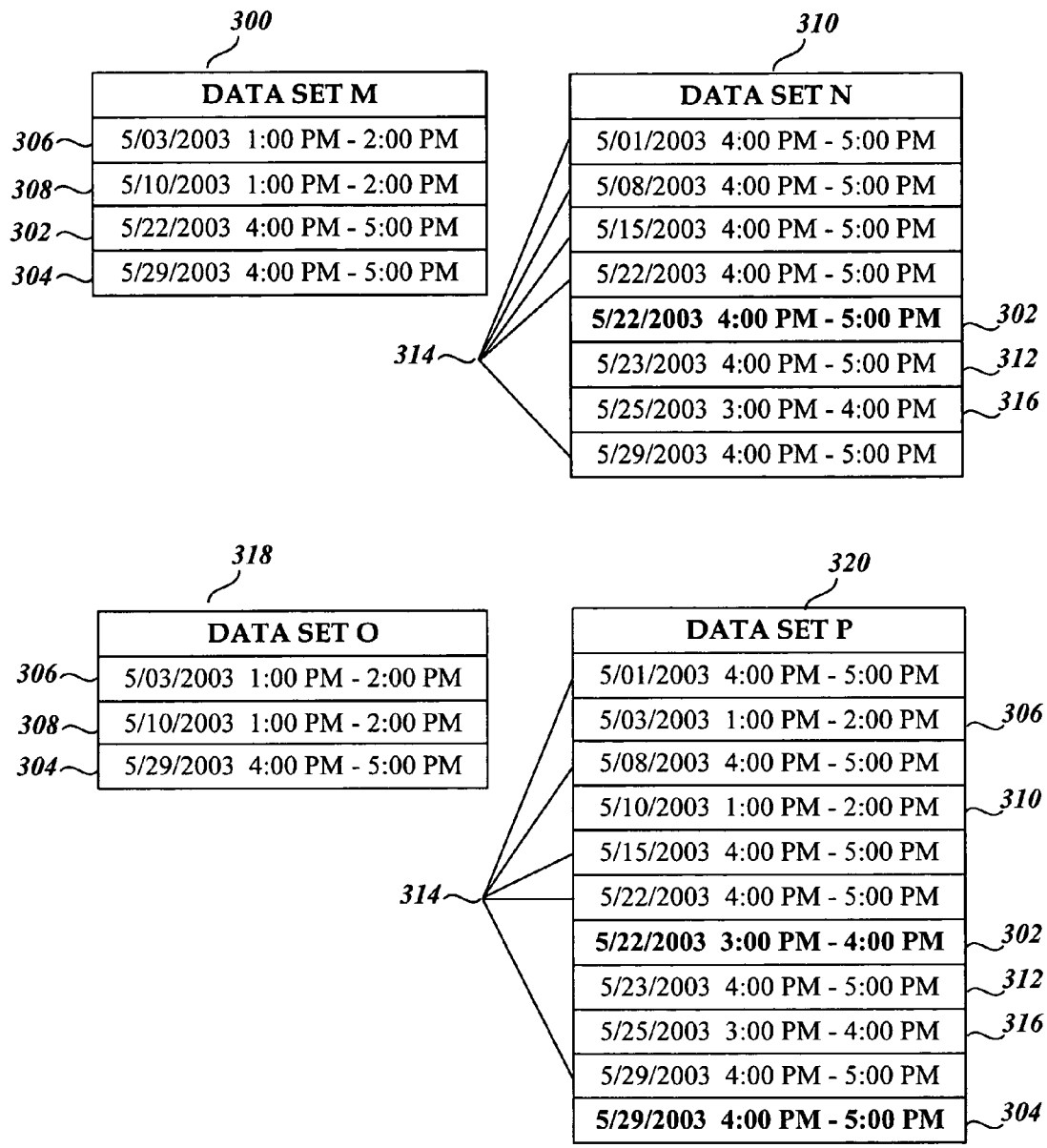
FIG. 6 is a table of calendar items derived from the data sets in FIGS. 3-5 that illustrates a representative section of a sample calendar, which is used to illustrate the system and method of filtering recurrence events in accordance with the present invention.

For purposes of illustrating the present invention, portions of a sample calendar are shown in FIG. 6 that are derived from the sample data sets illustrated in FIGS. 3-5. Although FIG. 6 is a sample calendar, those skilled in the relevant art and others will appreciate that the present invention may be implemented in alternative ways and in other environments.

As described above, recurrence events are stored as a single record in a database, such as event database 200. The expansion engine 208 receives data sets from a database that contain recurrence events and generates one or more items from the data sets. More specifically, when a data set like data set P 320 is obtained by the expansion engine 208, items like those illustrated in FIG. 6 may be generated. The following description includes specific references to the items of FIG. 6 in order to better illustrate certain aspects of the present invention.

The sample calendar shown in FIG. 6 contains items from each of the data sets 300, 310, 318, and 320. The sample calendar contains a weekly recurrence event that spans six (6) years from May 4, 2000, to May 24, 2006 (only the period from May 1, 2003, through May 30, 2003, is visible in FIG. 6). The weekly recurrence event corresponds to RECURRENCE A1 314 that is expanded into individual items in DATA SET N. The weekly recurrence event has a "start time" of 4:00 PM and an "end time" of 5:00 PM. The sample calendar 600 also includes a number of individual items and exceptions to recurrence events. The individual items are represented by EVENT A1 312 and EVENT B1 316 that are scheduled for the following dates and have the respective start and end times: May 23, 2003 4:00 PM-5:00 PM, May 25, 2003 3:00 PM-4:00 PM. The exceptions to recurrence events are represented by EXCEPTION A1 302, EXCEPTION A2 304, EXCEPTION B1 306, and EXCEPTION B2 308 that are scheduled for the following dates and have the respective start and end times: May 22, 2003 4:00 PM-5:00 PM, May 29, 2003 4:00 PM-5:00 PM, May 3, 2003 1:00 PM-2:00 PM, and May 10, 2003 1:00 PM-2:00 PM.

The sample calendar shown in FIG. 6 also illustrates how the set operations described with reference to FIGS. 3-5 are applied in calendar software. Also, the sample calendar demonstrates why existing calendar software is unable to support filtering of recurrence events. Exceptions prevent an instance of a recurrence event from being displayed to a user. In FIG. 6, exceptions that have a matching instance of a recurrence event are represented in bold. The exceptions include EXCEPTION A1 302 in data set N 310 and EXCEPTION A1 302 and EXCEPTION A2 304 in data set P 320. If an exception is filtered by a SQL filter and its associated recurrence event is not filtered, the exception is not able to prevent an instance of a recurrence event from being displayed to the user. Typically, existing calendar software uses a data set like data set N 310 to generate items for display to the user. However, as illustrated in FIG. 6, data set N 310 does not contain all of the exceptions that are needed to replace instances of RECURRENCE A1 314. More specifically, data set N 310 does not contain EXCEPTION A1 302.

Existing calendar software does not support filtering of recurrence events because recurrence events are stored in a database as a single record. While storing recurrence events in a single record has many benefits, it also limits the ability of existing calendar software to use the embedded functionality of the database. Databases such as event database 200 are not designed to filter recurrence events that are stored as a single record. The present invention enables filtering of recurrence events by obtaining a data set of exceptions (i.e., data set M 300), identifying exceptions that are not contained in the filtered data set (i.e., data set N 310), and creating a new data set of filtered items and not included exceptions (i.e., data set P 320). Instead of generating output for transmission to the user based on the filtered data set (i.e., data set N 310), the new data set of filtered items and not included exceptions (i.e., data set P 320) is used to generate output for display to the user.

Once the necessary data sets are generated by the middle tier 200, items are prepared for transmission to a client computing device, such as client computing device 102A. Existing calendar software supports paging and centering of items based on the request received from the user. Paging and centering are handled in the paging/centering module 210 of the middle tier 202. Since subroutines for centering and paging items are provided in existing calendar software, these subroutines are not described.

Figure 7:
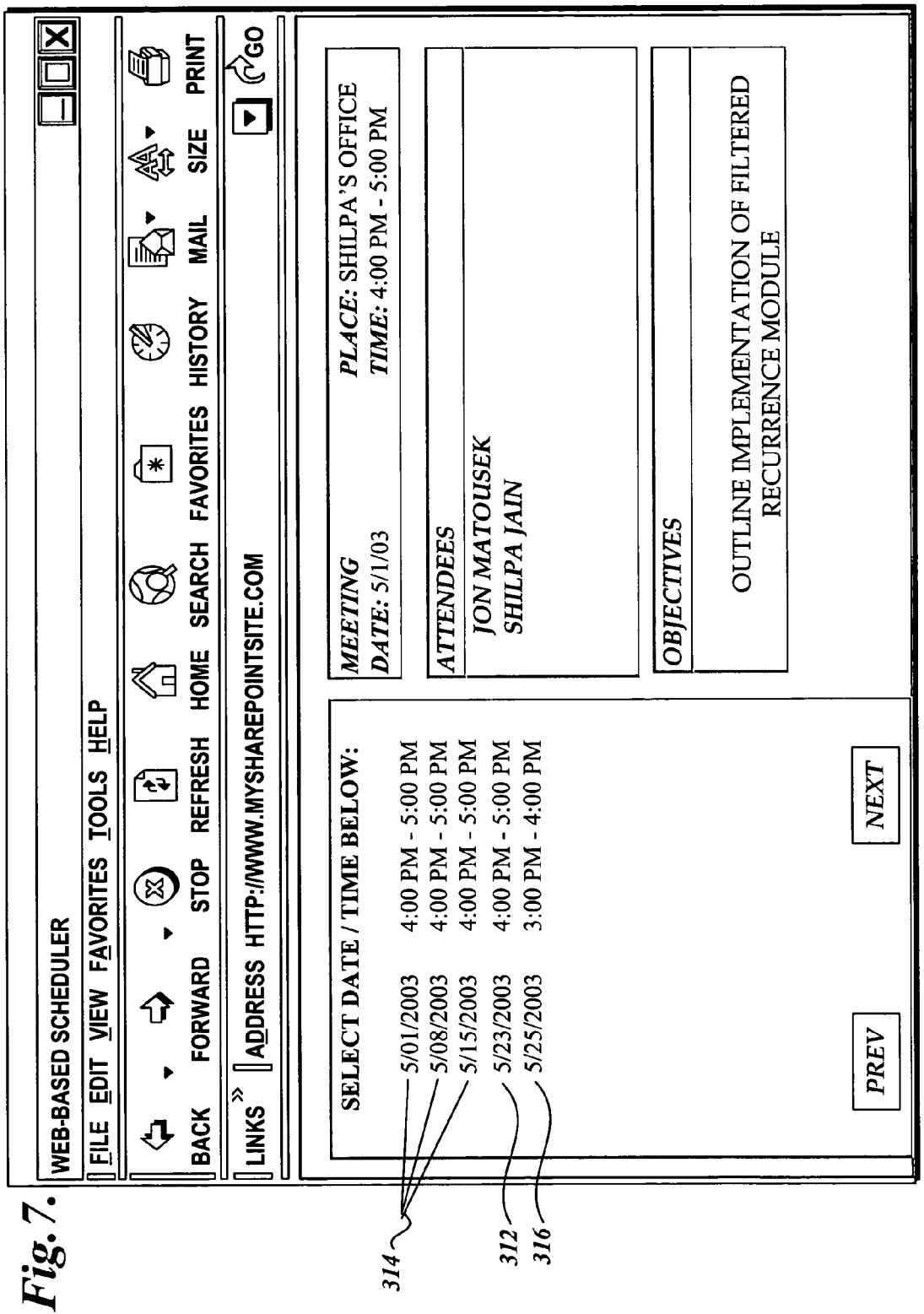
FIG. 7 is a pictorial diagram illustrating an exemplary graphical user interface used to display items in accordance with the present invention.

With reference to FIG. 7, once the centering or paging is handled, output is generated for viewing by the user. Similar to the paging/centering module 210 described above, existing calendar software supports rendering items for viewing by the user. Rendering items for viewing by the user is handled by the view-rendering module 206 of the middle tier 202. In an exemplary embodiment, the view-rendering module 206 generates Hypertext Markup Language (HTML) documents for transmission to a client computing device like client computing device 102A. FIG. 7 shows data set P 320 as an exemplary HTML document suitable for viewing by a user.

Figure 8A:
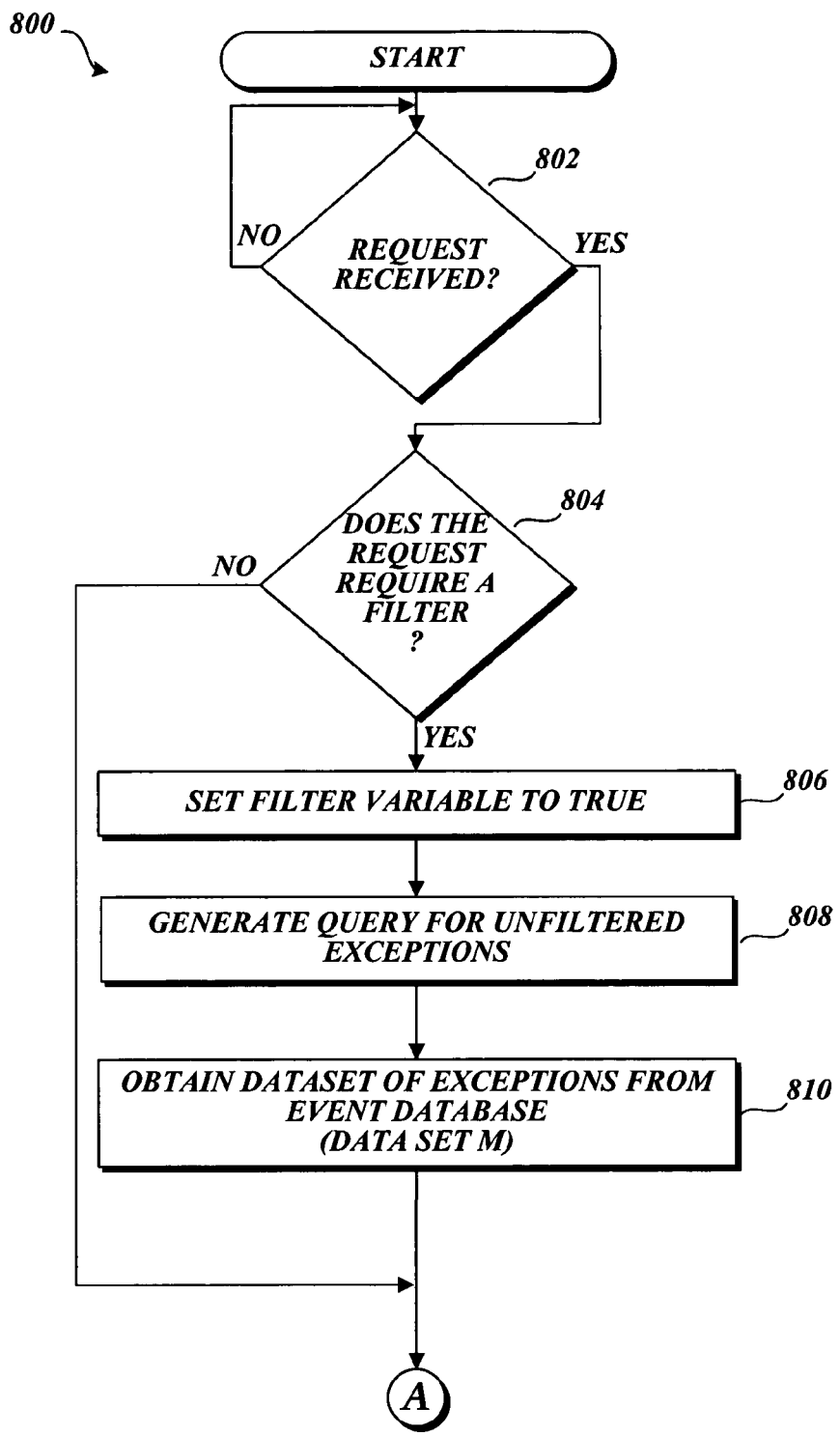
FIG. 8 is a flow diagram illustrating a method used to enable filtering of recurrence events in accordance with the present invention.
Figure 8B:
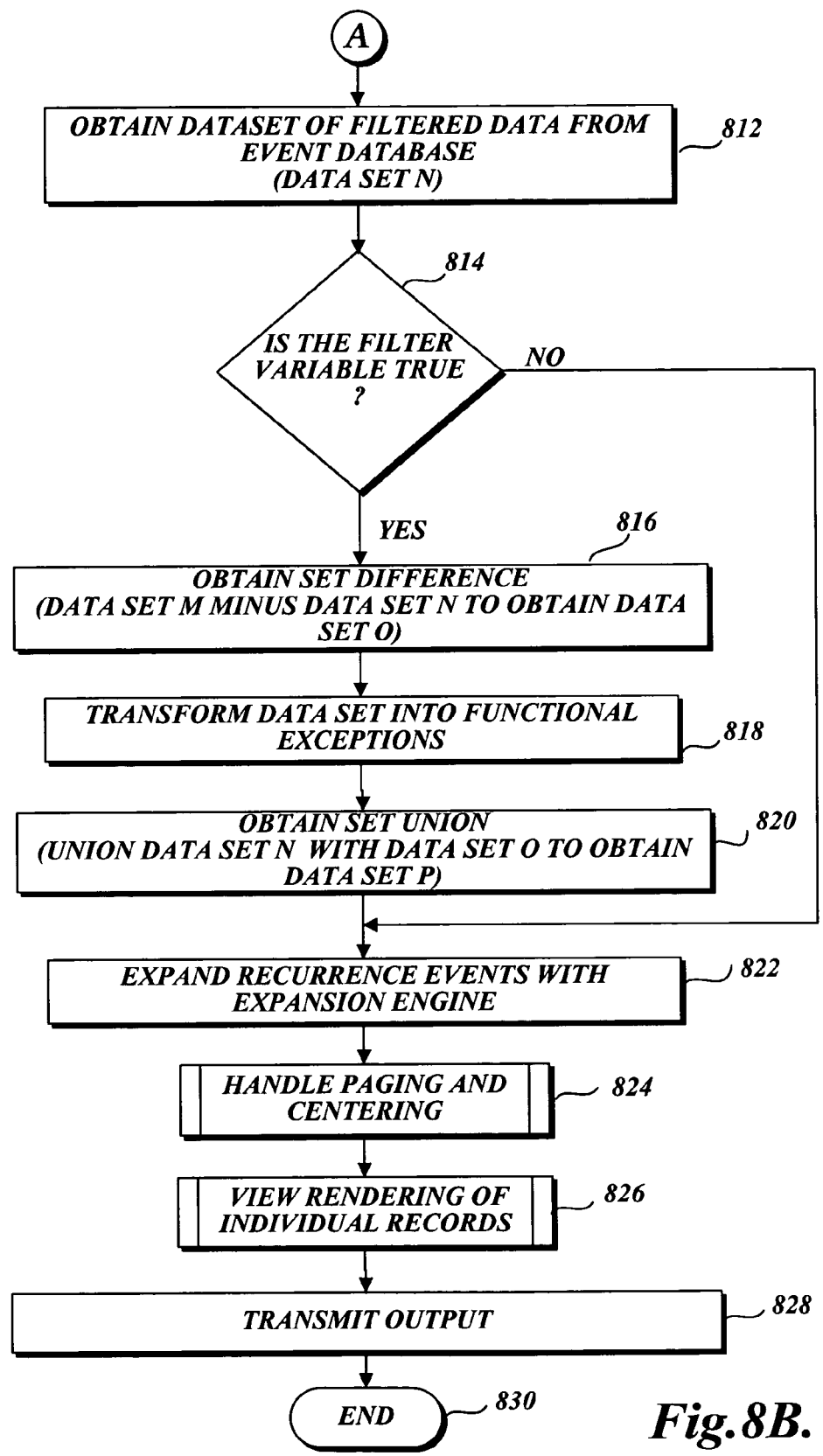

FIG. 8 is a flow diagram illustrating one exemplary embodiment of a recurrence event display method 800 formed in accordance with the invention that enables filtering of recurrence events. In summary, the recurrence event display method 800 includes receiving a request to view a display of items. In response to the request, the method displays a list of items, including filtered recurrence events. The recurrence event display method 800 differentiates between requests that require filtering and those that do not require filtering. For those requests that require filtering, additional processing filters recurrence events. With continuing reference to FIGS. 1-6 and the accompanying description, the exemplary recurrence event display method 800 shown in FIG. 8 will now be described.

The recurrence event display method 800 begins at block 802 where the method waits for a request to display at least one item. A display request is created by the use of conventional existing calendar software. For instance, a mechanism for generating a display request may be created by the use of a Web server executing calendar software such as Microsoft SharePoint®. In such existing calendar software, a control button for generating a display request is provided on a graphical user interface formed by a markup document.

Upon receipt of a display request, the recurrence display method 800 proceeds to decision block 804 where the method determines whether the request requires a filter. In existing programs including calendar software like Microsoft SharePoint®, the ability to apply filters to items in a database is supported. As described above, an example filter in calendar software is where a meeting organizer 90 filters an event from some users because they do not need to attend the event. At decision block 804, the recurrence event display method 800 determines if a filter is required to satisfy the request received from the user. If a filter is not required, the recurrence event display method 800 proceeds to block 814 described below.

If a filter is applied, at block 806 the filter variable is set to true. When an item has a true filter variable, the filtered recurrence module 208 of the middle tier 210 obtains a data set of exceptions (i.e., data set M 300) from a database, such as event database 200. As described above, the data set of exceptions is used to construct two additional data sets that enable filtering of recurrence events.

At block 808 a query for the data set of exceptions is generated. In an exemplary embodiment, the query is a SQL query and the data set of exceptions is stored in a SQL database. Since a SQL query may be generated in any one of different methods known in the relevant art, the process is not described here. Also, it should be understood that the query description is for illustration purposes only, and should be construed as exemplary and not limiting. The type of query and database used to satisfy the query may vary substantially from the embodiment described above.

At block 810 a data set of exceptions (i.e., data set M 300) is received in response to the query generated at block 808. All future and past exceptions that are within the time frame of the request are obtained. The time frame of the request may be any time period, such as a few minutes, a few hours, a year, two years, or even infinity. In an example utilizing the sample calendar 600 illustrated in FIG. 6, if the time frame is for future items within one (1) month and the display request (block 802) is made on Thursday, May 1, 2003, the method obtains all exceptions from May 1, 2003, to May 31, 2003.

At block 812 a data set of filtered events, recurrence events, and exceptions (i.e., data set N 310) is obtained in response to a query. As described above, existing calendar software uses a data set like data set N 310 to generate items for display to the user. Since data sets like data set N 310 are obtained by existing calendar software, the process of generating a query and receiving a data set in return is not described here.

After the data set of filtered items is obtained, the recurrence event display method 800 proceeds to decision block 814 where the method determines if the filter variable is true. As described above, the filter variable is set to true when filtering is required to satisfy a request received from a user. If a filter is not applied, the recurrence event display method 800 proceeds to block 822 described below.

If a filter is required, the data sets obtained at block 810 (i.e., data set M 300) and block 812 (i.e., data set N 310) are used to construct two additional data sets used to enable filtering of recurrence events. At block 816 a set difference operation is performed on data sets obtained at block 810 (i.e., data set M 300) and block 812 (i.e., data set N 310) to form a new data set (i.e., data set O 318). The set difference operation identifies all exceptions that exist in the data set obtained at block 810 (i.e., data set M 300) that do not exist in the data set obtained at block 812 (i.e., data set N 310). As a result, the new data set (i.e., data set 318) contains exceptions that were excluded from the data set obtained at block 810 as a result of an applied filter.

At block 818 exceptions identified at block 816 (i.e., data set O 318) are transformed into functional exceptions that prevent an instance of a recurrence event from being displayed to the user. As described above, exceptions prevent an instance of a recurrence event from being displayed to the user by replacing a unique identifier associated with each instance of a recurrence event (i.e., instance identifier). However, to make the necessary replacement, instance identifiers are associated with appropriate exceptions identified at block 816 (i.e., data set O 318). At block 818 the data set obtained at block 812 (i.e., data set N 310) is searched for an instance of a recurrence event that will be replaced by an exception in the data set identified at block 816. If an instance of a recurrence event is identified for replacement, its instance identifier is associated with the appropriate exception.

At block 820 a set union operation is performed on data sets obtained at block 812 (i.e., data set N 310) and block 816 (i.e., data set O 318) to form another data set (i.e., data set P 320). The set union operation joins all events, recurrence events, and exceptions that exist in data sets obtained at block 812

(i.e., data set N 310) with the exceptions that exist in the data set obtained at block 816 (i.e., data set O 318).

At block 822 recurrence events are expanded to obtain instances of the event. The process of expanding recurrence events includes other subroutines and processes that are included in existing calendar software. In such known processes, recurrence events are produced and merged with other items. Since subroutines for expanding recurrence events are provided in existing calendar software, detailed descriptions of such subroutines and related processes are not described here.

At block 824 items to be displayed are prepared (i.e., paged and centered) for transmission to a client computing device. Existing calendar software supports paging or centering of calendar items based on the request received from the user. Since subroutines for paging and centering are handled in existing calendar software, detailed descriptions of such subroutines and related processes are not provided here.

At block 826 output is rendered for viewing on a client computing device. As described above with reference to FIG. 7, existing calendar software supports rendering of items for transmission to the user. When rendering items for transmission to the user, existing calendar software discards exceptions that do not have associated recurrence events. For example, EXCEPTION B1 306 and EXCEPTION 32 308 (FIGS. 3-5) are included in the data set P 320 used to render items for display to the user. These unnecessary exceptions that do not have associated recurrence events are discarded at block 824.

At block 828 the calendar items rendered at block 826 are transmitted to a client computing device such as client computing devices 102A, 102B, 102C, 102D, and 102E described with reference to FIG. 1. As mentioned above, transmission of data between computing devices may use any one of a number of protocols or techniques known in the art. At block 830, the method terminates.

While the presently preferred embodiment of the invention has been illustrated and described, it will be readily appreciated by those skilled in the art and others that, within the scope of the appended claims, various changes can be made therein without departing from the spirit and scope of the invention.

The embodiments of the invention in which an exclusive property or privilege is claimed are defined as follows:

1. A computer-implemented method of filtering recurrence events comprising:
in response to receiving a request to display a recurrence event in a computing device, determining if a filter for identifying items that match a search criteria defined by the user is required to satisfy said request, wherein said recurrence event is represented in a database in a single database record;
if a filter is required to satisfy said request:
creating a data set that is stored in the memory of the computing device related to said recurrence event consisting of filtered items and exceptions;
structuring said data set of filtered items and exceptions for display on the computing device, wherein structuring said data set includes expanding said recurrence event from the single database record;
conversely, if a filter is not required to satisfy said request:
creating a data set that is stored in the memory of the computing device related to said recurrence event consisting of filtered items, recurrence events, and exceptions; and
structuring said data set of filtered items, recurrence events, and exceptions for display on the computing device, wherein structuring said data set includes expanding said recurrence event from the single database record.

2. The method of claim 1, wherein the request to display at least one recurrence event is generated by a client computing device.

3. The method of claim 1, wherein the request to display at least one recurrence event is received by a server computing device.

4. The method of claim 3, wherein the server computing device includes a database that supports a Structure Query Language.

5. The method of claim 1, wherein creating a data set that is stored in the memory of the computing device consisting of filtered items and exceptions comprises:
obtaining a data set of exceptions;
obtaining a data set of filtered items, the data set of filtered items including recurrence events and exceptions;
identifying exceptions that are not included in the exceptions included in the data set of filtered items by applying a set operation on the data set of exceptions and the data set of filtered items; and
adding the exceptions that are not included in the data set of filtered items to the data set of filtered items.

6. The method of claim 5, wherein obtaining a data set of exceptions comprises:
generating a database query that requests exceptions;
applying said database to a database query; and
in response to said database query, receiving said data set of exceptions.

7. The method of claim 5, wherein obtaining a data set of filtered items comprises:
generating a database query that requests recurrence events and exceptions;
applying said database query to a database; and
in response to said database query, receiving said data set of recurrence events and exceptions.

8. The method of claim 5, wherein identifying exceptions that are not included in the exceptions included in the data set of filtered items comprises performing a computer-implemented set difference operation between:
the exceptions; and
the data set of filtered items.

9. The method of claim 5, wherein adding the subset of exceptions that are not included in the data set of filtered items to the data set of filtered items comprises performing a computer-implemented set union operation between:
the exceptions; and
the data set of filtered items.

10. The method of claim 1, further comprising rendering said data set of filtered items structured for display on the computing device on the display associated with the computing device.

11. The method of claim 10, wherein said rendering comprises generating a Hypertext Markup Language document suitable for display by a Web browser program.

12. The method of claim 11, wherein said Hypertext Markup Language document displays a calendar that contains at least one item.

13. A computer-readable medium bearing computer-executable instructions which, when executed, carry out a computer-implemented method of filtering recurrence events comprising:
in response to receiving a request to display a recurrence event in a computing device, determining if a filter for identifying items that match a search criteria defined by the user is required to satisfy said request, wherein said recurrence event is represented in a database in a single database record;

if a filter is required to satisfy said request:
creating a data set that is stored in the memory of the computing device related to said recurrence event consisting of filtered items and exceptions;
structuring said data set of filtered items and exceptions for display on the computing device, wherein structuring said data set includes expanding said recurrence event from the single database record;

conversely, if a filter is not required to satisfy said request:
creating a data set that is stored in the memory of the computing device related to said recurrence event consisting of filtered items, recurrence events, and exceptions; and
structuring said data set of filtered items, recurrence events, and exceptions for display on the computing device, wherein structuring said data set includes expanding said recurrence event from the single database record.

14. The computer-readable medium of claim 13, wherein the request to display at least one recurrence event is generated by a client computing device.

15. The computer-readable medium of claim 13, wherein the request to display at least one recurrence event is received by a server computing device.

16. The computer-readable medium of claim 15, wherein the server computing device includes a database that supports a Structure Query Language.

17. The computer-readable medium of claim 13, wherein creating a data set that is stored in the memory of the computing device consisting of filtered items and exceptions comprises:
obtaining a data set of exceptions;
obtaining a data set of filtered items, the data set of filtered items including recurrence events and exceptions;
identifying exceptions that are not included in the exceptions included in the data set of filtered items; and
adding the exceptions that are not included in the data set of filtered items to the data set of filtered items.

18. The computer-readable medium of claim 17, wherein obtaining a data set of exceptions comprises:
generating a database query that requests exceptions;
applying said database to a database query; and
in response to said database query, receiving said data set of exceptions.

19. The computer-readable medium of claim 17, wherein obtaining a data set of filtered items comprises:
generating a database query that requests recurrence events and exceptions;
applying said database query to a database; and
in response to said database query, receiving said data set of recurrence events and exceptions.

20. The computer-readable medium of claim 17, wherein identifying exceptions that are not included in the exceptions included in the data set of filtered items comprises performing a computer-implemented set difference operation between:
the exceptions; and
the data set of filtered items.

21. The computer-readable medium of claim 17, wherein adding the subset of exceptions that are not included in the data set of filtered items to the data set of filtered items comprises performing a computer-implemented set union operation between:
the exceptions; and
the data set of filtered items.

22. The computer-readable medium of claim 13, further comprising rendering said data set of filtered items structured for display on the computing device on the display associated with the computing device.

23. The computer-readable medium of claim 22, wherein said rendering comprises generating a Hypertext Markup Language document suitable for display by a Web browser program.

24. The computer-readable medium of claim 23, wherein said Hypertext Markup Language document displays a calendar that contains at least one item.

* * * * *